United States Patent
Willis et al.

(10) Patent No.: US 10,771,450 B2
(45) Date of Patent: Sep. 8, 2020

(54) METHOD AND SYSTEM FOR SECURELY PROVISIONING A REMOTE DEVICE

(71) Applicant: BlackBerry Limited, Waterloo (CA)

(72) Inventors: Edward Snow Willis, Ottawa (CA); Hashim Mohammad Qaderi, Kitchener (CA); Scott Hutchens, Ottawa (CA); David Alan Inglis, Stittsville (CA)

(73) Assignee: BlackBerry Limited, Waterloo (CA)

( * ) Notice: Subject to any disclaimer, the term of this patent is extended or adjusted under 35 U.S.C. 154(b) by 259 days.

(21) Appl. No.: 15/869,824

(22) Filed: Jan. 12, 2018

(65) Prior Publication Data

US 2019/0222569 A1 Jul. 18, 2019

(51) Int. Cl.
| | |
|---|---|
| *H04L 29/06* | (2006.01) |
| *H04W 12/00* | (2009.01) |
| *H04W 12/06* | (2009.01) |
| *G06F 8/65* | (2018.01) |

(Continued)

(52) U.S. Cl.
CPC .......... *H04L 63/0823* (2013.01); *G06F 8/65* (2013.01); *H04L 41/0806* (2013.01); *H04L 63/06* (2013.01); *H04L 63/0853* (2013.01); *H04L 67/141* (2013.01); *H04W 12/003* (2019.01); *H04W 12/0609* (2019.01); *H04L 63/10* (2013.01); *H04L 67/12* (2013.01)

(58) Field of Classification Search
CPC ................................................ H04L 63/0823; H04L 67/141; H04L 41/0806
See application file for complete search history.

(56) References Cited

U.S. PATENT DOCUMENTS

| | | | | |
|---|---|---|---|---|
| 8,806,209 | B2* | 8/2014 | Hemphill | H04L 9/0819 |
| | | | | 713/171 |
| 9,215,228 | B1* | 12/2015 | Zhang | H04L 63/08 |
| 9,800,413 | B2* | 10/2017 | Alrabady | H04L 9/321 |

(Continued)

FOREIGN PATENT DOCUMENTS

WO 2016108012 A1 7/2016

OTHER PUBLICATIONS

European Patent Office, Extended European Search Report for Application No. 19150587.4-1218, published Apr. 4, 2019.

*Primary Examiner* — Lynn D Feild
*Assistant Examiner* — Viral S Lakhia
(74) *Attorney, Agent, or Firm* — Moffat & Co

(57) ABSTRACT

A method at a computing device for provisioning a network-connected device within a security platform, the method including receiving a first connection request, the first connection request being from an electronic apparatus and including a network-connected device identifier; authenticating the first connection request, thereby creating a first connection; receiving a second connection request, the second connection request being from the network-connected device and including the network-connected device identifier and a shared platform credential; receiving a request from the network-connected device to add the network-connected device to the security platform; and adding the network-connected device to the security platform based on a concurrent first connection and the request from the network-connected device to add the network-connected device to the security platform.

17 Claims, 5 Drawing Sheets

(51) Int. Cl.
*H04L 12/24* (2006.01)
*H04L 29/08* (2006.01)

(56) References Cited

U.S. PATENT DOCUMENTS

| | | | |
|---|---|---|---|
| 10,064,043 B2* | 8/2018 | Lau | H04L 65/1016 |
| 10,230,522 B1* | 3/2019 | Roths | H04W 76/10 |
| 10,637,834 B2* | 4/2020 | Lee | H04L 41/082 |
| 2013/0036231 A1 | 2/2013 | Suumaki | |
| 2015/0229475 A1* | 8/2015 | Benoit | G06F 21/34 |
| | | | 713/168 |
| 2016/0272150 A1* | 9/2016 | Doshi | B60R 22/48 |
| 2017/0012956 A1* | 1/2017 | Lee | H04L 67/42 |
| 2017/0244600 A1* | 8/2017 | Hussein | H04L 41/0806 |
| 2017/0280491 A1* | 9/2017 | Salkintzis | H04W 8/265 |
| 2017/0374695 A1* | 12/2017 | Lau | H04L 65/1053 |
| 2018/0184298 A1* | 6/2018 | Chen | H04W 12/02 |
| 2018/0338242 A1* | 11/2018 | Li | H04W 12/00512 |
| 2018/0373863 A1* | 12/2018 | Domke | G06F 21/44 |
| 2019/0036965 A1* | 1/2019 | Luo | H04L 45/74 |
| 2019/0141526 A1* | 5/2019 | Bahrami | H04W 12/06 |
| 2019/0200405 A1* | 6/2019 | Gupta | H04W 76/00 |
| 2019/0268332 A1* | 8/2019 | Wang | H04L 9/3231 |

* cited by examiner

METHOD AND SYSTEM FOR SECURELY PROVISIONING A REMOTE DEVICE

FIELD OF THE DISCLOSURE

The present disclosure relates to the provisioning Internet of Things (IoT) devices to a security platform, and in particular relates to the provisioning of IoT devices to the security platform after the devices have been deployed in the field.

BACKGROUND

Network-connected devices often contain software that occasionally needs to be updated. For example, in vehicles, an Electronic Control Unit (ECU) controls a system or subsystem of the vehicle, and may occasionally need firmware or software updates.

However, to provide updates, security measures need to be implemented. In particular, it is undesirable for a network-connected device to receive updates from unverified sources. Such updates may contain malicious code that may be harmful to the network-connected device.

Further, security ensures that the update is only provided to intended network-connected devices. In particular, a device that is not a valid device should not receive the updates, as they may contain proprietary information.

Further, tampering of traffic between devices and the service may result in either party believing that the message was from the other one in reality an attacker crafted them. In this case, security should prevent such tampering of traffic between the devices and services.

Such security is typically provided based on certificates and keys used by the parties to the transaction to create secure messaging. One issue, however, is that network-connected devices may be deployed into the field without having credentials that would allow for the security described above.

BRIEF DESCRIPTION OF THE DRAWINGS

The present disclosure will be better understood with reference to the drawings, in which.

DETAILED DESCRIPTION OF THE DRAWINGS

Figure 1:
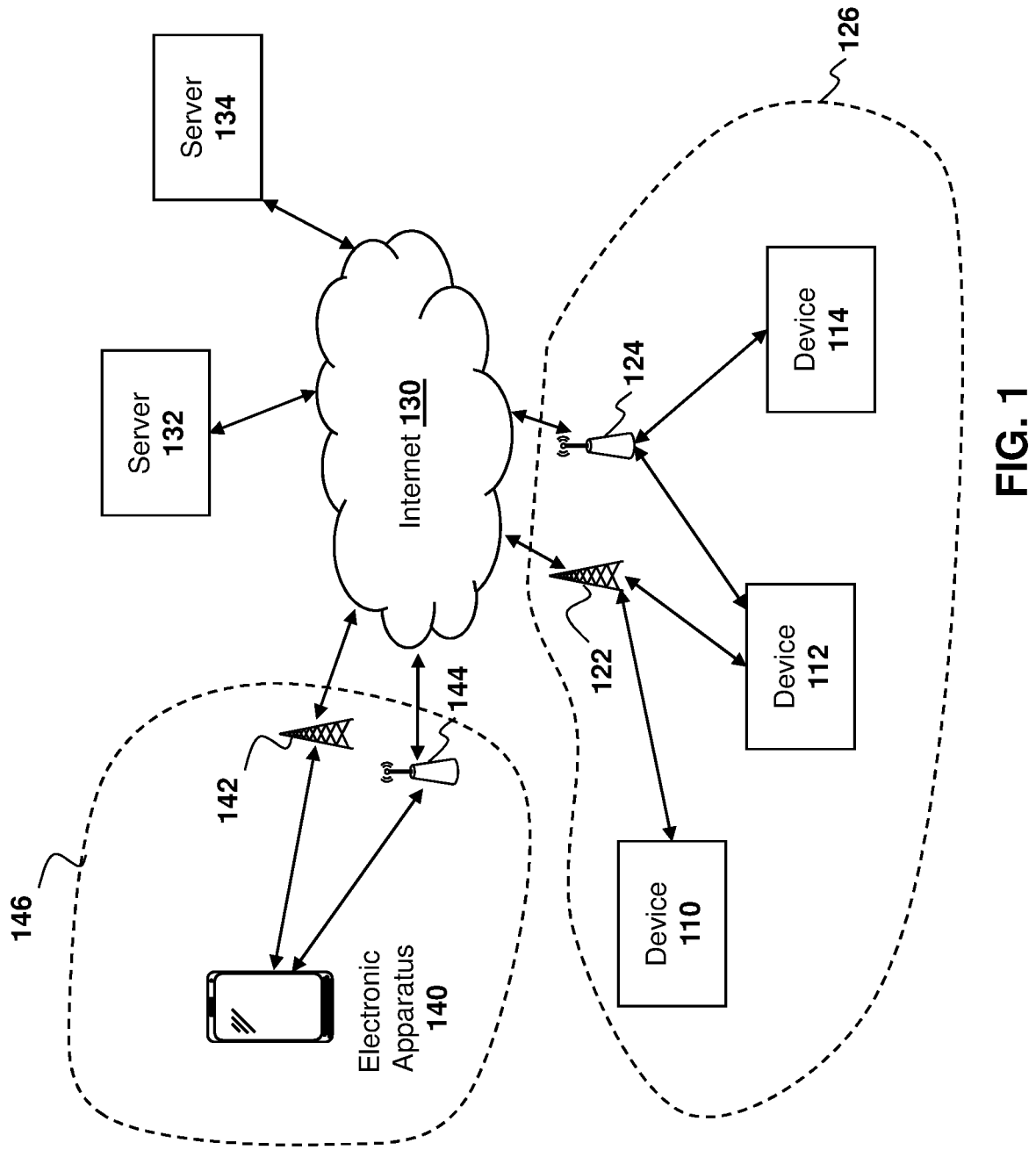
FIG. 1 is a block diagram showing an example architecture for a system in accordance with the embodiments of the present disclosure.

The present disclosure provides a method at a computing device for provisioning a network-connected device within a security platform, the method comprising: receiving a first connection request, the first connection request being from an electronic apparatus and including a network-connected device identifier; authenticating the first connection request, thereby creating a first connection; receiving a second connection request, the second connection request being from the network-connected device and including the network-connected device identifier and a shared platform credential; receiving a request from the network-connected device to add the network-connected device to the security platform; and adding the network-connected device to the security platform based on a concurrent first connection and the request from the network-connected device to add the network-connected device to the security platform.

The present disclosure further provides a computing device configured for provisioning a network-connected device within a security platform, the computing device comprising: a processor; and a communications subsystem, wherein the computing device is configured to: receive a first connection request, the first connection request being from an electronic apparatus and including a network-connected device identifier; authenticate the first connection request, thereby creating a first connection; receive a second connection request, the second connection request being from the network-connected device and including the network-connected device identifier and a shared platform credential; receive a request from the network-connected device to add the network-connected device to the security platform; and add the network-connected device to the security platform based on a concurrent first connection and the request from the network-connected device to add the network-connected device to the security platform.

The present disclosure further provides a computer readable medium for storing instruction code, which when executed by a processor of a computing device configured for provisioning a network-connected device within a security platform, cause the computing device to: receive a first connection request, the first connection request being from an electronic apparatus and including a network-connected device identifier; authenticate the first connection request, thereby creating a first connection; receive a second connection request, the second connection request being from the network-connected device and including the network-connected device identifier and a shared platform credential; receive a request from the network-connected device to add the network-connected device to the security platform; and add the network-connected device to the security platform based on a concurrent first connection and the request from the network-connected device to add the network-connected device to the security platform.

An issue addressed by the present disclosure is how to securely bring a network-connected device under the control of an IoT platform for future provisioning and updates once such device is deployed in the field. In accordance with the embodiments herein, such secure provisioning of the network-connected device onto the IoT platform uses a secondary electronic apparatus, along with interaction with the network-connected device.

Specifically, a network-connected device starts outside of the IoT platform. In accordance with the embodiments herein, a network-connected device may then receive software for installation. Such software may be provided over the air from a network source or by a device such as a smartphone or USB stick. The initial software provides credentials which are known by the IoT platform as a distinct device, referred to herein as a Globally Available Shared Physical Provisioning Device (GASPD). Such device is not a physical device within the IoT platform, but is merely used for the creation of an identity within such IoT platform, and as such has no other capabilities or uses to which it can be put.

For example, in the IOT platform as described below, the permissions and capabilities may be assigned to devices. For a GASPD device, the only use permitted is the creation of new devices.

Devices in the IOT platform are also containers for certificates and public keys used to both identify the client endpoint representing the platform device and also to secure communications with it.

Initially, all in-field network-connected devices would only know about the GASPD and would all share the same certificate and key pair. In accordance with the present disclosure, a device may be added to the network using a device-specific certificate and key pair, which may be generated and published to the IOT platform in a manner which minimizes the risk or loss of security. Specifically, such security may be provided by used of a secondary, authenticated electronic apparatus, as well as physical interaction with the network-connected device.

A network-connected device, as used herein, may be any stationary or mobile computing device. For example, the device may be any device affixed to or part of shipping containers, truck trailers, or truck cabins in one embodiment. In other embodiments, the device may be affixed to or part of any vehicle, including motor vehicles (e.g. automobiles, cars, trucks, buses, motorcycles, etc.), aircraft (e.g. airplanes, unmanned aerial vehicles, unmanned aircraft systems, drones, helicopters, etc.), spacecraft (e.g. space planes, space shuttles, space capsules, space stations, satellites etc.), watercraft (e.g. ships, boats, hovercraft, submarines etc.), rail vehicles (e.g. trains and trams, etc.) and other types of vehicles including any combination of the foregoing, whether currently existing or after arising, among others.

In other cases, the network-connected device may be a device such as an Internet of things (IOT) device, endpoints, home automation devices, medical equipment in hospital or home environments, inventory tracking devices, environmental monitoring devices, energy management devices, infrastructure management devices, vehicles or devices for vehicles, fixed electronic devices, among others.

The network-connected device may connect, in some cases, to a network through another device. For example, the network-connected device may be an ECU in a vehicle that communicates using a gateway in the vehicle to connect to, for example, a cellular network. Other options for such devices are possible.

Further the electronic apparatus used for security may be any computing device, including a mobile device such as a cellular telephone, smartphone, internet appliance, laptop, desktop computer, smart watch, wearable, or other similar device.

While the embodiments of the present disclosure are provided below with regard to vehicle systems, the present disclosure is not limited to vehicle systems and any device having a network connection can be used with the embodiments of the present disclosure.

In the case of vehicles, a vehicle may be deployed in the field without having an over the air (OTA) client which may manage the provisioning of updates to ECUs on the vehicle. Further, in vehicle fleets, it may be cumbersome to have all such vehicles proceed to a service center to have such over the air client installed on the vehicle. Therefore, in accordance with the present disclosure, methods and systems are provided for creating an IoT platform device securely.

In particular, reference is now made to FIG. 1, which shows a simplified architecture for a system in accordance with the present disclosure. In the embodiment of FIG. 1, a plurality of devices, namely devices 110, 112 and 114, communicate through a base station 122 or access point 124 to the Internet 130 or other similar network. As provided above, devices 110, 112, or 114 may be any device that needs to have software updates, and may, for example, be an ECU in a vehicle.

Communication may be with one or a plurality of the servers, such as servers 132 or 134 in the embodiment of FIG. 1. For example, server 132 may be an authentication server while server 134 may be an over-the-air switchboard server, as described below, in one embodiment. However, in other embodiments, the functionality of servers 132 and 134 may be found on a single server.

An electronic apparatus 140 communicates through a base station 142 or access point 144 with Internet 130, and may thereby communicate with servers 132 and 134.

The electronic apparatus 140 and a network device such as device 110 may be on different private networks. For example, a network-connected device may be secured on a private cellular network. Many cellular carriers are configured utilizing private networks.

However, the electronic apparatus may be on a different private network or may not be part of a private network.

Given that there is no guarantee that the network-connected device and the electronic apparatus are on the same private network, direct connectivity between the electronic apparatus and the device being updated may be difficult.

Based on this, in accordance with the present disclosure, an intermediary server is provided, referred to herein as an over-the-air (OTA) switchboard. This server component is hosted in a manner that makes it available from the public Internet and therefore both the network-connected device and the electronic apparatus can connect to such server.

For example, in the embodiment of FIG. 1, electronic apparatus 140 is in a first private network 146 with a carrier and device 110 may be in a second private network 126, with the same or a different carrier.

Based on potentially being on different private networks, communication may occur between an electronic apparatus 140 and a device 110 utilizing a server 132, as described in more detail below.

The system of FIG. 1 includes an authentication service of some form. Such authentication service may be provided in a variety of ways. For example, a support portal may be used in some embodiments. Generally, a service is provided which a user can authenticate against.

Further, the architecture of FIG. 1 provides for the existence of software or an application on electronic apparatus 140, which the user can use to log into the authentication service and to select a network-connected device of interest to them.

Typically, security for updating devices such as devices 110 or 112 may be accomplished by having an IoT platform which controls such devices. In this regard, reference is made to FIG. 2.

Figure 2:
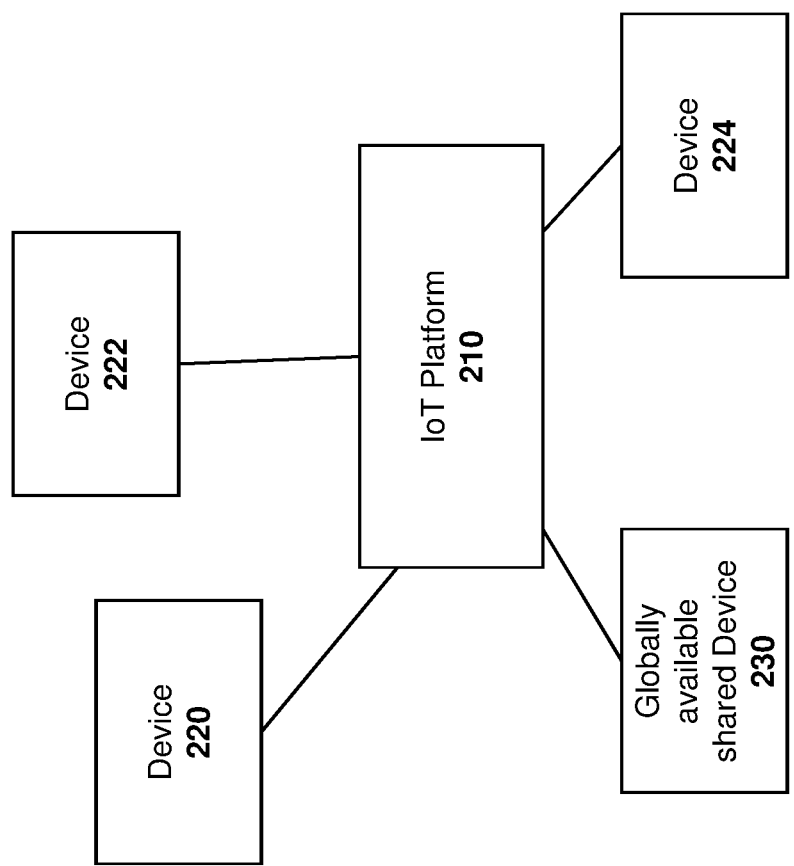
FIG. 2 is a block diagram showing an architecture for an IoT platform.

In the embodiment of FIG. 2, an IoT platform 210 is shown. An IoT platform, as used herein, is software or a service on a server or within a cloud that connects everything within an IoT system. The IoT platform 210 can control software updates for the various devices that are within the IoT platform. As such, IoT platform 210 may have a plurality of registered devices that are connected to it, with each such device having various permissions within the IOT system.

In the example of FIG. 2, a plurality of the devices is registered on the IOT platform 210. Specifically, devices 220, 222, and 224 are registered and have identities within the IoT platform 210. In this regard, devices 220, 222 and 224 may be capable of establishing secure connections with update servers to provide updates for the software and firmware on such IoT devices.

Other devices that have been deployed in the field may not yet be under the IoT platform 210. In accordance with the embodiments of the present disclosure, software may be delivered to the such devices.

Specifically, in the vehicle example, an over the air client is provided to a vehicle having credentials to make the device a "globally available shared provisioning device". Such GASPD is configured within IoT platform 210 as a device within the IoT system.

The credentials include a GASPD certificate and private key, which are delivered as part of the over the air client software. The OTA client software may, for example, be delivered and installed on a network-connected device based on wireless technologies including cellular, WiFi or short range wireless communications. Alternatively, the software may be based on wired communications or physical device such as a Universal Serial Bus (USB) memory stick.

Once such software is installed on the network-connected device, the device therefore becomes a globally available shared provisioning device within the IOT platform 210. An example of the globally available shared provisioning device is shown as device 230 in the embodiment of FIG. 2.

The use of GASPD credentials is secure only if private key for the GASP device is never leaked. Specifically, the certificate and private key may be universal for the entire fleet of vehicles.

Therefore, to better address the vulnerability of having a universal private key for all the vehicles, a security mechanism is provided to convert a GASP device to a device on the IoT platform having its own security credentials.

The embodiments described herein involve an electronic apparatus separate from the vehicle to authenticate a user of the electronic apparatus with an authentication server. Thereafter, physical interaction with the vehicle along with the authentication of the electronic apparatus will allow for the creation of a vehicle within the IoT platform, including the creation of vehicle-specific certificate and private key/ public key pair, where the public key may be securely delivered to the IoT platform.

Figure 3:
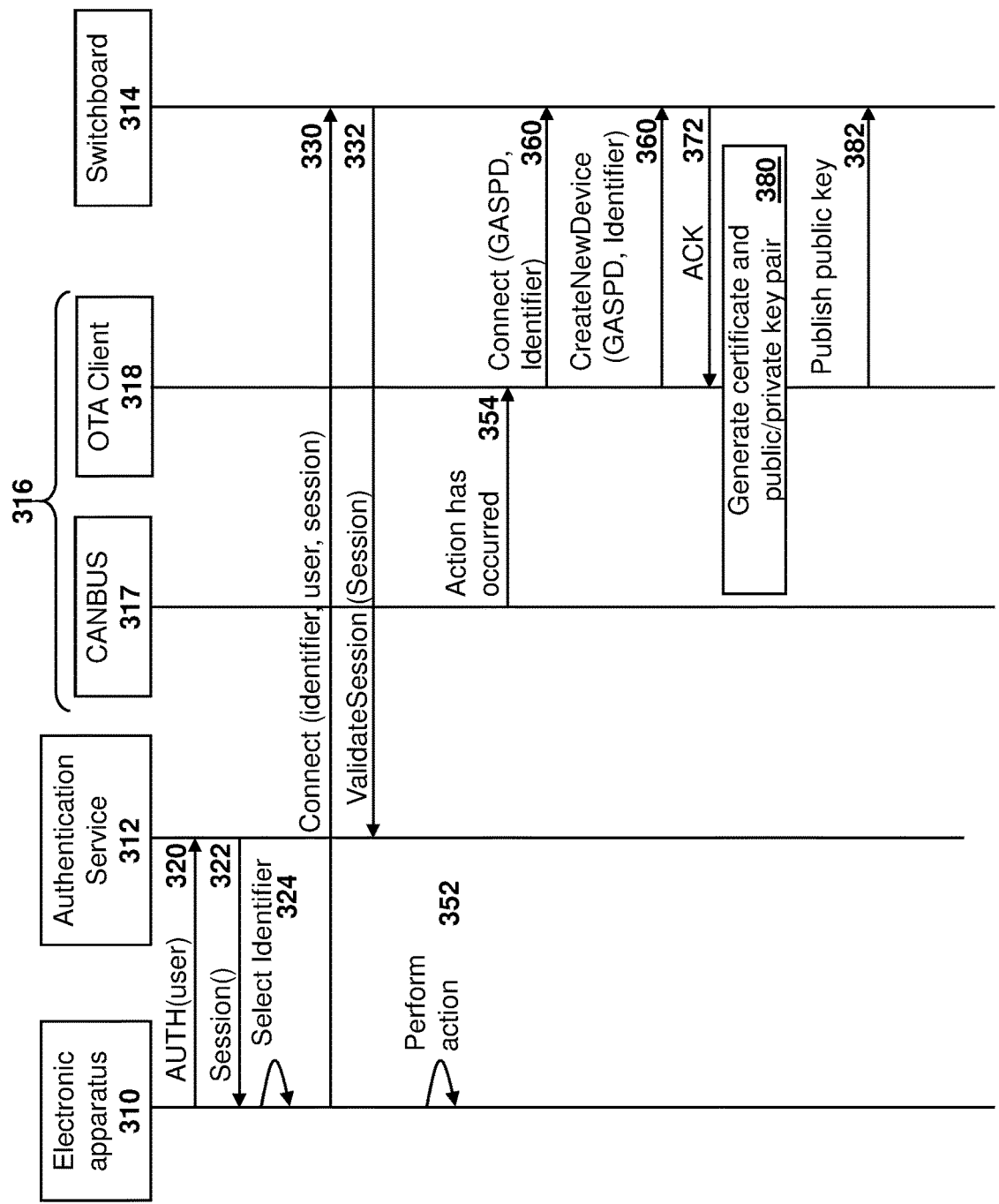
FIG. 3 is a data flow diagram showing the creation of a device identity for an IoT platform.

Specifically, reference is now made to FIG. 3. In the embodiment of FIG. 3, an electronic apparatus 310 may include software or an application for initiating the creation of an IOT platform device.

An authentication service 312 provides authentication for the electronic apparatus 310, and in particular for a user of the electronic apparatus 310.

Further, a switchboard 314 allows communication between electronic apparatus 310 and a vehicle as described above.

The vehicle 316 includes internal communications between components or ECUs. Such internal communications may be based on any wired or wireless technology. Internal communications may allow for certain actions within the vehicle to be reported to the over the air client. In the example of FIG. 3, the internal communication is performed using CANBUS 317.

Further, vehicle 316 includes an over the air client 318. The OTA client 318 provides for communication between the vehicle 316 and a switchboard 314.

In other embodiments, rather than internal communications such as a CANBUS 317, the OTA client 318 may sense interaction with the network-connected device directly, and thus a CANBUS 317 is optional.

In accordance with the embodiment of FIG. 3, an over the air client 318 may have been provided on a vehicle. For example, this may have been done utilizing a USB stick or over the air download to install the over the air client 318 on the vehicle. Such over the air client would have been installed with a globally available shared provisioning certificate and public/private key pair. However, in accordance with the embodiments of the present disclosure, the use of such global credentials may be undesirable to enhance the security of the network.

Therefore, in accordance with the embodiment of FIG. 3, the credentials for the globally available shared provisioning device may be updated to create device-specific credentials using interaction with the vehicle and electronic apparatus 310.

In particular, in the embodiment of FIG. 3, electronic apparatus 310 authenticates a user with the authentication service 312. This may be done using a message 320, which may include user credentials.

Based on the credentials received at message 320, the authentication service 312 may authenticate the user and provide session credentials back to the electronic apparatus, shown by message 322.

Once the user of the electronic apparatus is authenticated with the authentication service 312, an identifier for the vehicle or device that is being created within the IoT platform may be entered. The identifier may be any number, code, or designation that uniquely identifies the object.

The identifier may be provided to the electronic apparatus in various ways. For example, for a vehicle, the identification may be provided by manually entering a vehicle identification number, or by scanning a barcode or QR code in the vehicle.

In other embodiments, the identifier may be input utilizing a pre-stored list within the electronic apparatus 310. For example, a user may be presented with a list of vehicle identifiers for vehicles associated with the electronic apparatus 310, and the user may select an identifier from the list.

Other options for entering an identifier into the electronic apparatus 310 are possible, and the present disclosure is not limited to any method of providing the identifier to the electronic apparatus.

The entering of the identifier is shown in the embodiment of FIG. 3 with arrow 324.

Subsequently, the electronic apparatus 310 connects and communicates with switchboard 314 by sending a connect message 330. Connect message 330 may include various information. For example, in the embodiment of FIG. 3, the message includes the identifier entered at arrow 324, session information obtained in message 322, as well as user information. However, in other embodiments different information be provided in the connect message 330.

The switchboard 314 may then validate the session received in connect message 330 with authentication service 312, as shown by arrow 332.

As will be appreciated by those in the art, the authentication service may be part of the switchboard 314, in which case, the validation at arrow 332 is internal. Further, in this case, the session token may not be required to be sent from the electronic apparatus.

Once the electronic apparatus is connected to the switchboard 314, the electronic apparatus 310 may then prompt the user to perform an action which would not normally occur while the vehicle is operating. For example, in the embodiment of FIG. 3, the prompt may involve instructing a user to press or hold a button or combination of buttons available to the user on the vehicle. This is shown with arrow 352 in the embodiment of FIG. 3.

In particular, the combination of the actions at arrow 352 would typically not occur during the normal operation of the vehicle, thereby causing the vehicle to recognize that a provisioning attempt is occurring. Specifically, in the embodiment of FIG. 3, the vehicle realizes that button or combination of buttons is being pressed, and may report that the button or the combination of buttons has been pressed, as shown with message 354.

The OTA client 318 receives both messages 350 and 354, which may cause the OTA client 318 to connect to the switchboard 314 by sending a connect message 360, along with an identifier such as the vehicle identification number. Further, message 360 may include the GASPD credentials at the OTA client.

Once the connection has been established, then the OTA client 318 may try to create a unique device within the IoT platform. This may be done be sending a create new message 370 message to switchboard 314, including information such as the device identifier and the GASPD credentials. If the switchboard 314 controls the IoT platform, it may then create the new identity. Specifically, based on the receipt of the create new device message, the switchboard 314 may perform some verification and upon determining that the new IoT platform identity should be created, the switchboard 314 may return an acknowledgement, shown at message 372.

If another server controls the IoT platform then the switchboard may forward the create new message request to the IoT platform server. Further, message 372 may then be provided to OTA client 318 based on acknowledgement from the other server.

Upon receiving the acknowledgement, the OTA client 318 may then generate a certificate and its own private key/public key pair, shown at block 380. The OTA client may then publish its public key to the switchboard, shown by message 382.

Thereafter, the vehicle 316 has its own credentials which may be used for subsequent updates of software or firmware within the vehicle.

Security for the above embodiment is provided in various ways. For example, if a request is received by switchboard 314 for a given network-connected device to create a new IoT platform device, and there is no concurrently connected electronic apparatus, then such request may be ignored. This avoids the situation where the button or combination of buttons have been pressed inadvertently. It further avoids having an unauthorized user attempt to create the IoT platform device.

Further, an electronic apparatus cannot connect with the switchboard unless authorized. If an application connects to switchboard 314, it provides a session identifier, which the switchboard 314 may then send back to the authentication service 312 to verify authenticity.

Further, if a request is received by switchboard 314 for a network-connected device to create a new platform device and there is a concurrently connected application indicating interest in the device identifier, but there is already a previously created device-specific platform device for that device identifier known to the platform, then the request to create a new platform identifier is rejected and the existing platform device for that device identifier is also disabled for security. This may be then flagged to an administrator as an anomalous situation. Such flag would allow administrators to intervene to make sure no attack was underway. In the case where there is no attack, an administrator could simply delete the existing platform device at the switchboard or IoT platform, and allow for the OTA client 318 to proceed through the embodiment of FIG. 3 to create a new platform connected device.

In a further case, if a request is received at the IoT platform for a given device to create a new platform device and there already is a concurrently connected application indicating interest in such device identifier, then the IoT platform would allow the device to create a certificate and public key and would handle the certificate sign in request on behalf of that device. From that point forward, the GASPD credentials are not used for the device, which has now created its own certificate and key pair. Therefore, the second connected electronic apparatus would be unable to create a new platform device for the same device identifier on the server.

Another possible security concern is that an attacker may sneak in at the create new device message 370 if they have the GASPD certificate and private key and pretend to be the over the air client 318. If an attacker did so, they would be able to create the platform specific device in the OTA switchboard and could leverage it to download packages. However, the OTA client on the real device would not know that this had happened and would still proceed with attempting to create a platform specific device for itself. The OTA switchboard would see the multiple requests to create the platform specific device for the same identifier, at which point it would disable the existing, bogus platform specific device and alert administrators or operators to take action, as this should never happen in normal usage.

Thus, even if the GASPD certificate or private key is leaked, an attacker could not use it to create bogus devices on the switchboard unless they know that the particular vehicle was about to create its own device, at which point the attacker would have to send a message during a small window, which would be closed immediately upon realization by the switchboard that the client itself was trying to create another platform identifier.

A further security vulnerability may be that an attacker would use the GASPD certificate and private key which has been leaked to execute a Denial Of Service (DOS) attack for the software deployment service by using it to cause the switchboard to disable many legitimate vehicle specific devices. However, the embodiment of FIG. 3 makes this difficult because any target vehicle that an attacker would wish to disable must also have a concurrent electronic apparatus session with the switchboard 314, or the switchboard 314 would entirely ignore the request.

In a further embodiment, to reduce the risk implied by the GASPD identifier, the OTA client 318 may delete such credentials from its memory once it has arranged to create a device-specific identifier for the switchboard. The GASPD identifiers have no legitimate use on the OTA client after the vehicle specific identifiers have been created.

In a further security consideration, if the GASPD certificate and private key are leaked, then vehicles that have not yet created their own certificate and public/private key pair may be vulnerable. In this case, the over the air software may need to be re-deployed having a new GASPD certificate and private key. This may involve an over the air download of such software or the distribution of the USB keys or other similar mechanisms. This may, in some embodiments, delay the provisioning of such over the air client software for vehicles that do not have device-specific identifiers. However, devices that have the device-specific certificates and public/private key pairs would be unaffected by such leak.

Based on FIGS. 1 to 3, a vehicle or other network device that is not secured in an IoT platform for updates can enable itself as a platform device by using a second electronic apparatus that authenticates with a server and provides feedback that such electronic apparatus is interested in a specific network device. The combination of the electronic apparatus and interaction with the network device allows for securing creating a platform device and sharing credentials.

The device being updated or the electronic apparatus may be any computing device. One simplified block diagram of a computing device is shown with regard to FIG. 4.

Figure 4:
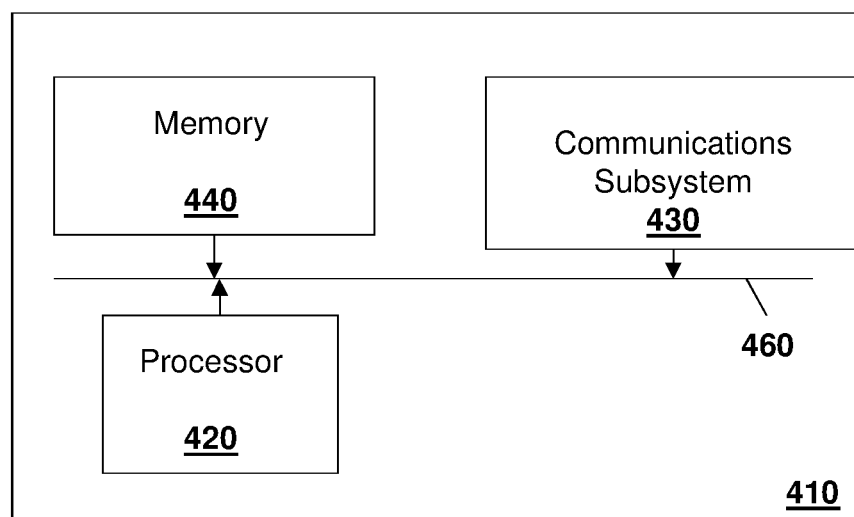
FIG. 4 is a block diagram of an example computing device capable of being used with the embodiments of the present disclosure.

In FIG. 4, computing device 410 includes a processor 420 and a communications subsystem 430, where the processor 420 and communications subsystem 430 cooperate to perform the methods of the embodiments described above. Communications subsystem 420 may, in some embodiments, comprise multiple subsystems, for example for different radio technologies.

Processor 420 is configured to execute programmable logic, which may be stored, along with data, on device 410, and shown in the example of FIG. 4 as memory 440. Memory 440 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 440, computing device 410 may access data or programmable logic from an external storage medium, for example through communications subsystem 430.

Communications subsystem 430 allows device 410 to communicate with other devices or network elements and may vary based on the type of communication being performed. For example, if computing device 410 is an ECU, communications subsystem 430 may be the interface to a CANBUS. If computing device 410 is a server or OTA client then communications subsystem 430 may include wired or wireless communications such as cellular, WiFi, ethernet, fiber, among other options. Further, communications subsystem 430 may comprise a plurality of communications technologies, including any wired or wireless communications technology.

Communications between the various elements of device 410 may be through an internal bus 460 in one embodiment. However, other forms of communication are possible.

The computing device of FIG. 4 could be any fixed or mobile device. If the computing device is a mobile device, one example mobile device is described below with regard to FIG. 5.

Mobile device 500 may comprise a two-way wireless communication device having voice or data communication capabilities or both. Mobile device 500 generally has the capability to communicate with other computer systems. Depending on the exact functionality provided, the mobile device may be referred to as a data messaging device, a two-way pager, a wireless e-mail device, a smartphone, a cellular telephone with data messaging capabilities, a wireless Internet appliance, a wireless device, a mobile device, an embedded cellular modem, an electronic device or a data communication device, as examples.

Where mobile device 500 is enabled for two-way communication, it may incorporate a communication subsystem 511, including a receiver 512 and a transmitter 514, as well as associated components such as one or more antenna elements 516 and 518, local oscillators (LOs) 513, and a processing module such as a digital signal processor (DSP) 520. As will be apparent to those skilled in the field of communications, the particular design of the communication subsystem 511 will be dependent upon the communication network in which the mobile device is intended to operate.

Network access requirements will also vary depending upon the type of network 519. In some networks, network access is associated with a subscriber or user of the mobile device 500. A mobile device may require an embedded or a removable user identity module (RUIM) or a subscriber identity module (SIM) card or a UMTS SIM (USIM) in order to operate on a network. The USIM/SIM/RUIM interface 544 is normally similar to a card-slot into which a USIM/SIM/RUIM card can be inserted and ejected. The USIM/SIM/RUIM card can have memory and hold many key configurations 551, and other information 553 such as identification, and subscriber related information.

Figure 5:
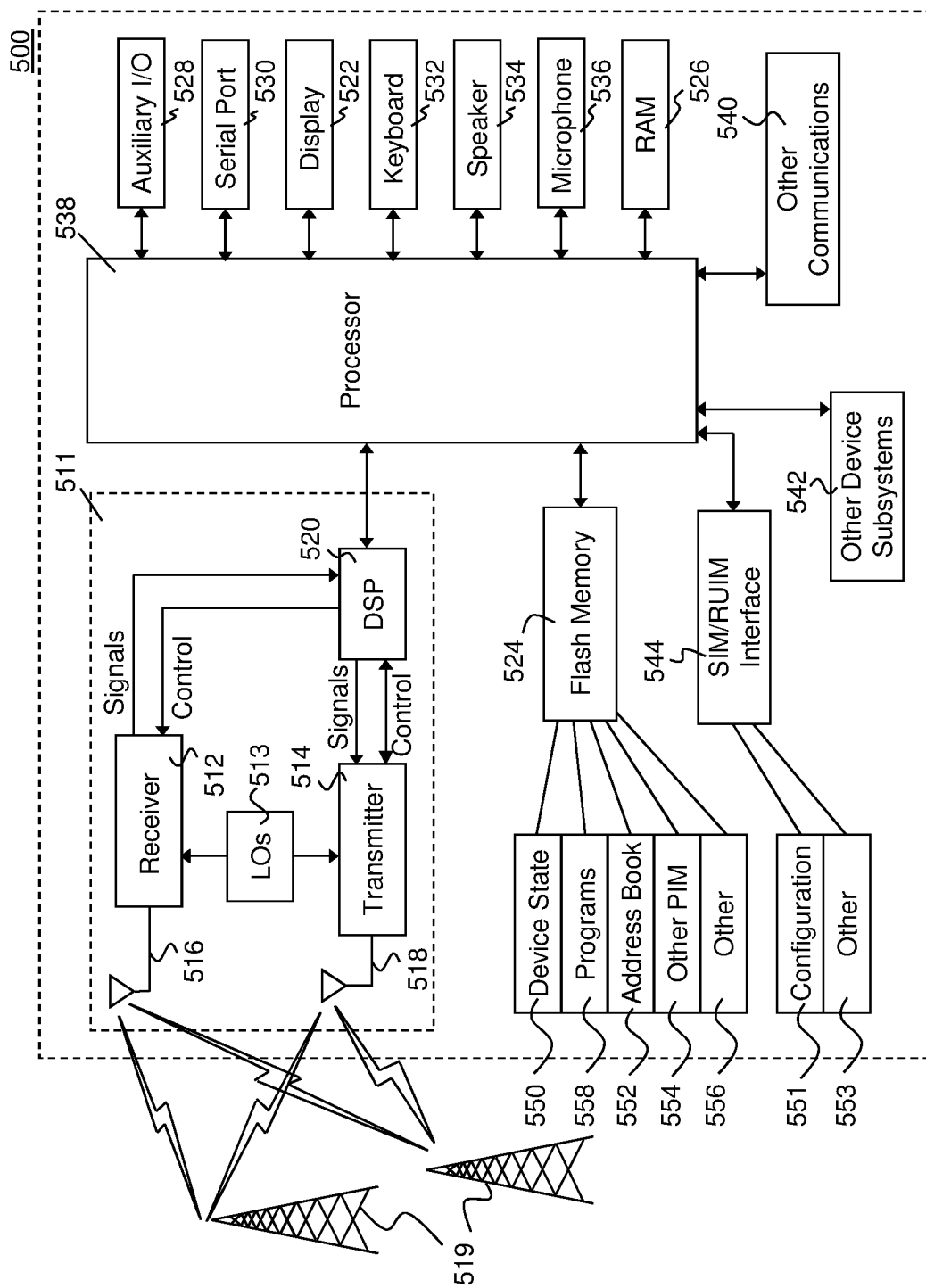
FIG. 5 is a block diagram of an example mobile device capable of being used with the embodiments of the present disclosure.

When required network registration or activation procedures have been completed, mobile device 500 may send and receive communication signals over the network 519. As illustrated in FIG. 5, network 519 can include multiple base stations communicating with the mobile device.

Signals received by antenna 516 through communication network 519 are input to receiver 512, which may perform such common receiver functions as signal amplification, frequency down conversion, filtering, channel selection and the like. Analog to digital (A/D) conversion of a received signal allows more complex communication functions such as demodulation and decoding to be performed in the DSP 520. In a similar manner, signals to be transmitted are processed, including modulation and encoding for example, by DSP 520 and input to transmitter 514 for digital to analog (D/A) conversion, frequency up conversion, filtering, amplification and transmission over the communication network 519 via antenna 518. DSP 520 not only processes communication signals, but also provides for receiver and transmitter control. For example, the gains applied to communication signals in receiver 512 and transmitter 514 may be adaptively controlled through automatic gain control algorithms implemented in DSP 520.

Mobile device 500 generally includes a processor 538 which controls the overall operation of the device. Communication functions, including data and voice communications, are performed through communication subsystem 511. Processor 538 also interacts with further device subsystems such as the display 522, flash memory 524, random access memory (RAM) 526, auxiliary input/output (I/O) subsystems 528, serial port 530, one or more keyboards or keypads 532, speaker 534, microphone 536, other communication subsystem 540 such as a short-range communications subsystem, DSRC subsystem 3GPP based V2X subsystem, or cellular subsystem, and any other device subsystems generally designated as 542. Serial port 530 could include a USB port, On-Board Diagnostics (OBD) port or other port known to those in the art.

Some of the subsystems shown in FIG. 5 perform communication-related functions, whereas other subsystems may provide "resident" or on-device functions. Notably, some subsystems, such as keyboard 532 and display 522, for example, may be used for both communication-related functions, such as entering a text message for transmission over a communication network, and device-resident functions such as a calculator or task list.

Operating system software used by the processor 538 may be stored in a persistent store such as flash memory 524, which may instead be a read-only memory (ROM) or similar storage element (not shown). Those skilled in the art will appreciate that the operating system, specific device applications, or parts thereof, may be temporarily loaded into a volatile memory such as RAM 526. Received communication signals may also be stored in RAM 526.

As shown, flash memory 524 can be segregated into different areas for both computer programs 558 and program data storage 550, 552, 554 and 556. These different storage types indicate that each program can allocate a portion of flash memory 524 for their own data storage requirements. Processor 538, in addition to its operating system functions, may enable execution of software applications on the mobile device. A predetermined set of applications that control basic operations, including potentially data and voice communication applications for example, will normally be installed on mobile device 500 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, messages, calendar events, voice mails, appointments, and task items. Further applications, including device update applications, productivity applications, social media applications, games, among others, may also be loaded onto the mobile device 500 through the network 519, an auxiliary I/O subsystem 528, serial port 530, short-range communications subsystem 540 or any other suitable subsystem 542, and installed by a user in the RAM 526 or a non-volatile store (not shown) for execution by the processor 538. Such flexibility in application installation increases the functionality of the device and may provide enhanced on-device functions, communication-related functions, or both.

In a data communication mode, a received signal such as a text message or web page download will be processed by the communication subsystem 511 and input to the processor 538, which may further process the received signal for output to the display 522, or alternatively to an auxiliary I/O device 528.

A user of mobile device 500 may also compose data items such as messages for example, using the keyboard 532, which may be a complete alphanumeric keyboard or telephone-type keypad, either physical or virtual, among others, in conjunction with the display 522 and possibly an auxiliary I/O device 528. Such composed items may then be transmitted over a communication network through the communication subsystem 511.

Where voice communications are provided, overall operation of mobile device 500 is similar, except that received signals may typically be output to a speaker 534 and signals for transmission may be generated by a microphone 536. Alternative voice or audio I/O subsystems, such as a voice message recording subsystem, may also be implemented on mobile device 500. Although voice or audio signal output is preferably accomplished primarily through the speaker 534, display 522 may also be used to provide an indication of the identity of a calling party, the duration of a voice call, or other voice call related information for example.

Serial port 530 in FIG. 5 may be implemented in a mobile device for which synchronization with a user's desktop computer (not shown) may be desirable, but is an optional device component. Such a port 530 may enable a user to set preferences through an external device or software application and may extend the capabilities of mobile device 500 by providing for information or software downloads to mobile device 500 other than through a wireless communication network. As will be appreciated by those skilled in the art, serial port 530 can further be used to connect the mobile device to a computer to act as a modem or for charging a battery on the mobile device.

Other communications subsystems 540, such as a short-range communications subsystem, is a further component which may provide for communication between mobile device 500 and different systems or devices, which need not necessarily be similar devices. For example, the subsystem 540 may include an infrared device and associated circuits and components or a Bluetooth™ or Bluetooth™ Low Energy communication module to provide for communication with similarly enabled systems and devices. Subsystem 540 may further include a DSRC radio or similar radio. Subsystem 540 may further include non-cellular communications such as Wi-Fi or WiMAX, or near field communications.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a computing device for provisioning a network-connected device within a security platform, the method comprising:
   receiving a first connection request, the first connection request being from an electronic apparatus distinct from the network-connected device, and including a network-connected device identifier for the network-connected device;
   authenticating the first connection request, thereby creating a first connection;
   receiving a second connection request, the second connection request being from the network-connected device and including the network-connected device identifier and a shared platform credential;
   receiving a request from the network-connected device to add the network-connected device to the security platform;
   adding the network-connected device to the security platform based on a concurrent first connection and the request from the network-connected device to add the network-connected device to the security platform;
   receiving a third connection request from a second network-connected device;
   determining that no connection request including an identifier for the second network-connected device was received from any electronic apparatus; and
   ignoring the third connection request.

2. The method of claim 1, further comprising:
   sending an acknowledgement to the network-connected device; and
   receiving a public key from the network-connected device.

3. The method of claim 1, wherein the second connection request is based on a physical interaction with the network-connected device.

4. The method of claim 1, further comprising, prior to the receiving the first connection request:
   sending client software to the network-connected device, the client software including the shared platform credential.

5. The method of claim 4, wherein the shared platform credential includes a certificate and a private key.

6. The method of claim 1, further comprising:
   receiving a fourth connection request, the fourth connection request being from a second electronic apparatus and including a network-connected device identifier;
   determining that authentication of the second electronic apparatus fails; and
   ignoring the fourth connection request.

7. The method of claim 1, further comprising, prior to the adding:
   determining that the network-connected device has been previously added to the security platform;
      ignoring the request from the network-connected device to add the network-connected device to the security platform; and
      disabling the network-connected device from the security platform.

8. The method of claim 7, further comprising creating a security flag for the network-connected device.

9. A computing device configured for provisioning a network-connected device within a security platform, the computing device comprising:
   a processor;
   a memory, and
   a communications subsystem,
wherein the computing device is configured to:
   receive a first connection request, the first connection request being from an electronic apparatus distinct from the network-connected device and including a network-connected device identifier for the network-connected device;
   authenticate the first connection request, thereby creating a first connection;
   receive a second connection request, the second connection request being from the network-connected device and including the network-connected device identifier and a shared platform credential;
   receive a request from the network-connected device to add the network-connected device to the security platform;
   add the network-connected device to the security platform based on a concurrent first connection and the request from the network-connected device to add the network-connected device to the security platform;

receive a third connection request from a second network-connected device;

determine that no connection request including an identifier for the second network-connected device was received from any electronic apparatus; and ignore the third connection request.

10. The computing device of claim 9, wherein the computing device is further configured to:

send an acknowledgement to the network-connected device; and receive a public key from the network-connected device.

11. The computing device of claim 9, wherein the second connection request is based on a physical interaction with the network-connected device.

12. The computing device of claim 9, wherein the computing device is further configured to, prior to receiving the first connection request:

send client software to the network-connected device, the client software including the shared platform credential.

13. The computing device of claim 12, wherein the shared platform credential includes a certificate and a private key.

14. The computing device of claim 9, wherein the computing device is further configured to:

receive a fourth connection request, the fourth connection request being from a second electronic apparatus and including a network-connected device identifier;

determine that authentication of the second electronic apparatus fails; and ignore the fourth connection request.

15. The computing device of claim 9, wherein the computing device is further configured to, prior to adding:

determine that the network-connected device has been previously added to the security platform;

ignore the request from the network-connected device to add the network-connected device to the security platform; and disable the network-connected device from the security platform.

16. The computing device of claim 15, wherein the computing device is further configured to create a security flag for the network-connected device.

17. A non-transitory computer readable medium for storing instruction code, which when executed by a processor of a computing device configured for provisioning a network-connected device within a security platform, cause the computing device to:

receive a first connection request, the first connection request being from an electronic apparatus distinct from the network-connected device and including a network-connected device identifier for the network-connected device;

authenticate the first connection request, thereby creating a first connection;

receive a second connection request, the second connection request being from the network-connected device and including the network-connected device identifier and a shared platform credential;

receive a request from the network-connected device to add the network-connected device to the security platform;

add the network-connected device to the security platform based on a concurrent first connection and the request from the network-connected device to add the network-connected device to the security platform;

receive a third connection request from a second network-connected device;

determine that no connection request including an identifier for the second network-connected device was received from any electronic apparatus; and ignore the third connection request.

* * * * *